US010562494B2

(12) United States Patent
Wagatha et al.

(10) Patent No.: US 10,562,494 B2
(45) Date of Patent: Feb. 18, 2020

(54) AUTHORIZATION OF USE OF A MOTOR VEHICLE

(71) Applicant: Bayerische Motoren Werke Aktiengesellschaft, Munich (DE)

(72) Inventors: Helmut Wagatha, Oberschleissheim (DE); Stefan Heinbockel, Munich (DE); Ralf Wistorf, Munich (DE); Fredrik Hocke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/010,158

(22) Filed: Jun. 15, 2018

(65) Prior Publication Data
US 2018/0290626 A1 Oct. 11, 2018

Related U.S. Application Data

(63) Continuation of application No. PCT/EP2016/068887, filed on Aug. 8, 2016.

(30) Foreign Application Priority Data

Dec. 18, 2015 (DE) .................. 10 2015 016 558

(51) Int. Cl.
*B60R 25/24* (2013.01)

(52) U.S. Cl.
CPC .......... *B60R 25/241* (2013.01); *B60R 25/245* (2013.01); *B60R 25/246* (2013.01)

(58) Field of Classification Search
CPC . H04B 5/00; G07C 9/00; G08C 19/00; G05B 5/19; B60R 25/00; B60R 25/24; B60R 25/40

(Continued)

(56) References Cited

U.S. PATENT DOCUMENTS 6,218,932 B1 * 4/2001 Stippler .................. B60R 25/04 307/10.2
6,906,612 B2 * 6/2005 Ghabra ................... B60R 25/24 340/5.61

(Continued)

FOREIGN PATENT DOCUMENTS

DE 197 12 911 A1 10/1998
DE 10 2005 013 910 B3 9/2006

(Continued)

OTHER PUBLICATIONS

International Search Report (PCT/ISA/210) issued in PCT Application No. PCT/EP2016/06887 dated Oct. 27, 2016 with English translation (six (6) pages).

(Continued)

*Primary Examiner* — Nam V Nguyen
(74) *Attorney, Agent, or Firm* — Crowell & Moring LLP

(57) ABSTRACT

A method for authorizing the use of a motor vehicle, including a first antenna and a second antenna, wherein the first antenna and the second antenna are spaced apart from each other in space, by a portable identification device that has an identification device antenna. According to the method, it is determined whether the identification device is moving toward the motor vehicle, which can be determined by the identification device repeatedly identifying the field strength of the signals emitted by the motor vehicle and examining whether the field strength is increasing. Alternatively, the identification device can repeatedly identify the angle between the signals emitted by the motor vehicle and examine whether the repeatedly identified angles are increasing.

19 Claims, 2 Drawing Sheets

(58) Field of Classification Search
USPC ... 340/5.61, 6.62, 5.7, 5.72, 539.13, 426.36; 455/41.1, 11.1
See application file for complete search history.

(56) References Cited

U.S. PATENT DOCUMENTS

| | | | | |
|---|---|---|---|---|
| 6,965,296 | B2* | 11/2005 | Kamlah | B60R 25/00 340/10.41 |
| 6,970,679 | B2* | 11/2005 | Blatz | G06K 19/0723 333/1.1 |
| 7,705,710 | B2* | 4/2010 | Hermann | B60R 25/24 340/426.11 |
| 8,284,020 | B2* | 10/2012 | Ghabra | B60R 25/245 340/5.61 |
| 8,442,719 | B1* | 5/2013 | Nowottnick | G07C 9/00309 701/36 |
| 8,630,748 | B2* | 1/2014 | Hermann | B60R 25/24 342/174 |
| 9,959,690 | B2* | 5/2018 | Zielinski | G07C 9/00023 |
| 9,963,109 | B2* | 5/2018 | Luo | B60R 25/245 |
| 2006/0214768 | A1 | 9/2006 | Hermann | |
| 2007/0162191 | A1* | 7/2007 | Matsubara | G07C 9/00309 701/1 |
| 2013/0063247 | A1 | 3/2013 | Blatz | |

FOREIGN PATENT DOCUMENTS

| | | |
|---|---|---|
| DE | 10 2010 010 057 A1 | 9/2011 |
| DE | 10 2011 079 421 A1 | 1/2013 |
| EP | 1 184 236 A2 | 3/2002 |
| EP | 1 403 653 A1 | 3/2004 |
| EP | 2 498 226 A | 9/2012 |

OTHER PUBLICATIONS

German-language Written Opinion (PCT/ISA/237) issued in PCT Application No. PCT/EP2016/06887 dated Oct. 27, 2016 (six (6) pages).

German-language Search Report issued in counterpart German Application No. 102015016558.5 dated Jul. 6, 2016 with partial English translation (sixteen (16) pages).

* cited by examiner

AUTHORIZATION OF USE OF A MOTOR VEHICLE

CROSS REFERENCE TO RELATED APPLICATIONS

This application is a continuation of PCT International Application No. PCT/EP2016/068887, filed Aug. 8, 2016, which claims priority under 35 U.S.C. § 119 from German Patent Application No. 10 2015 016 558.5, filed Dec. 18, 2015, the entire disclosures of which are herein expressly incorporated by reference.

BACKGROUND AND SUMMARY OF THE INVENTION

The invention relates to a method for authorization of the use of a motor vehicle, which has at least a first antenna and a second antenna, wherein the first antenna and the second antenna are physically separated from each other in space, by a portable identification encoder, which has an identification encoder antenna. The motor vehicle is preferably a two-wheeled or four-wheeled motor vehicle.

In such a known method it is desirable to further improve the method against manipulation.

An object of the invention consists in the provision of a method for authorizing the use of a motor vehicle, with improved protection against manipulation.

This object is achieved by a method for authorizing the use of a motor vehicle having the features of the independent method claim. Advantageous configurations of the method according to the invention are the subject matter of the dependent method claims.

DETAILED DESCRIPTION OF THE DRAWINGS

Figure 2:
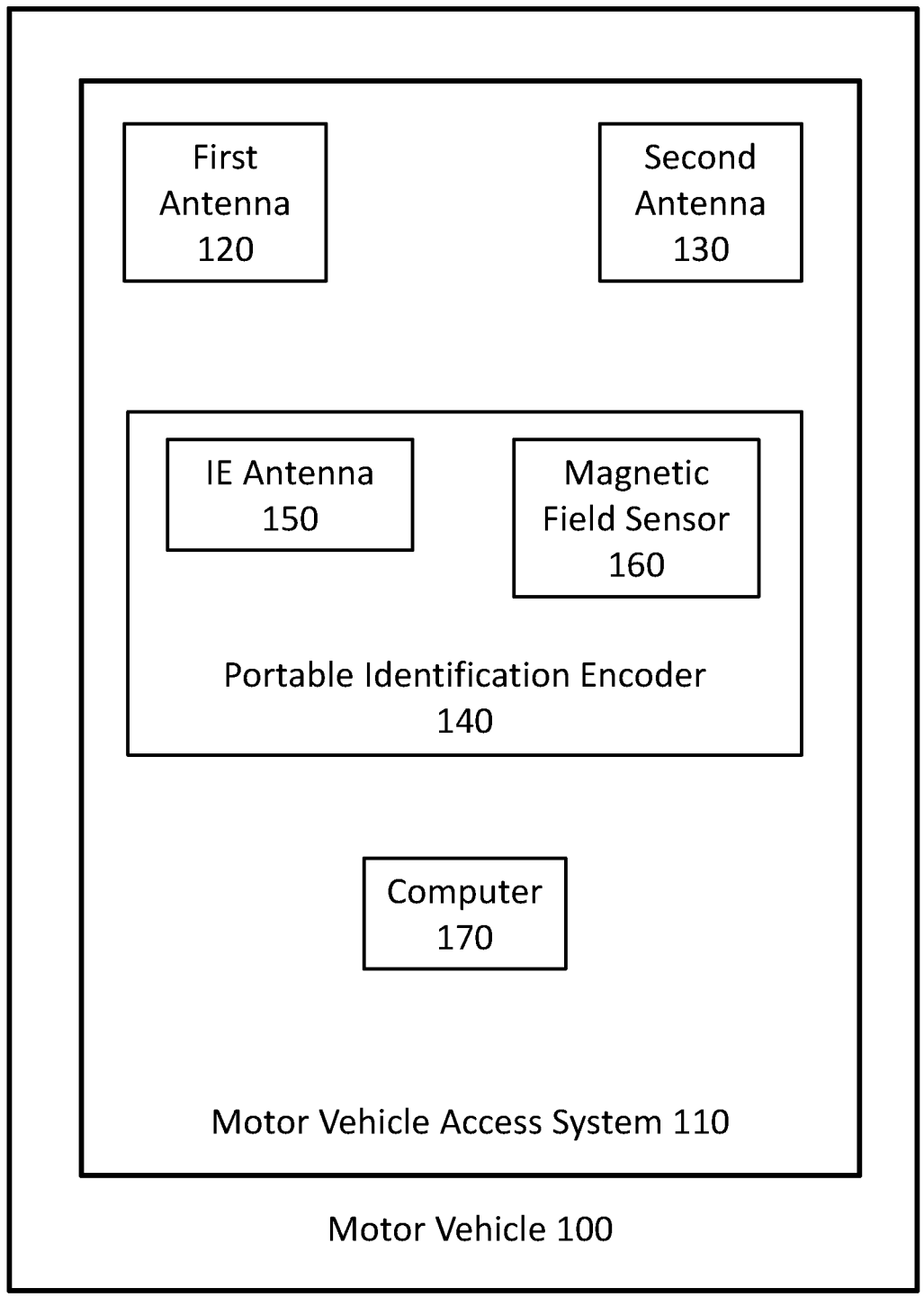
FIG. 2 illustrates a schematic block diagram of a motor vehicle and a motor vehicle access system according to the present invention.

The method according to the invention is based on a method for authorizing the use of a motor vehicle 100, in particular a two-wheeled or four-wheeled motor vehicle, which, as illustrated in FIG. 2, has at least one first antenna 120 and one second antenna 130, wherein the first antenna and the second antenna are physically separated from each other in space, by means of a portable identification encoder 140 that has an identification sensor antenna 150.

Figure 1:
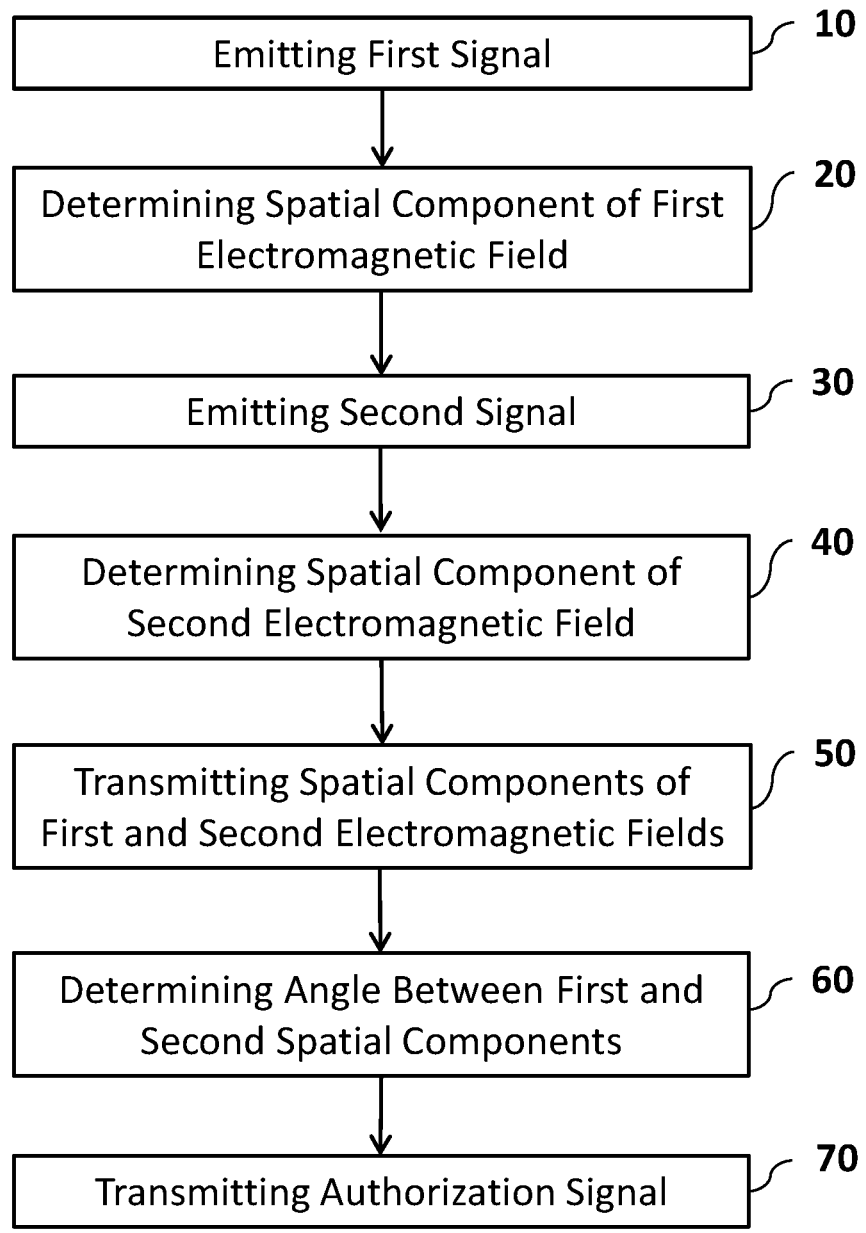
FIG. 1 illustrates a method according to the present invention.

This known method is extended according to the invention by the following steps, which are illustrated in FIG. 1.

In a first step 10 the first motor vehicle antenna emits a first signal, which is received by the identification sensor antenna.

In a second step 20, the identification encoder determines at least one of the spatial components of the first electromagnetic field of the received first signal, preferably using an angular resolution magnetic field sensor 160 as illustrated in FIG. 2.

In a third step 30, the second motor vehicle antenna emits a second signal, which is received by the identification sensor antenna.

In a fourth step 40, the identification encoder determines at least one of the spatial components of the second electromagnetic field of the received second signal, preferably using an angular resolution magnetic field sensor.

In a fifth step 50 the identification encoder repeatedly transmits the at least one determined spatial component of the first electromagnetic field of the received first signal, in each case after the expiration of a predetermined time interval, preferably of the first time interval, and repeatedly transmits the at least one determined spatial component of the second electromagnetic field of the received second signal, in each case after the expiration of a predetermined time interval, preferably of the first time interval, to the motor vehicle.

In a sixth step 60 a first computer, preferably a computer in the motor vehicle 170 as illustrated in FIG. 2, repeatedly determines after the expiration of a predetermined time interval, preferably after the expiration of a predefined first or second time interval, the angle at least between the determined spatial component of the first electromagnetic field of the received first signal and the determined spatial component of the second electromagnetic field of the received second signal.

In a seventh step 70, the motor vehicle only supplies an authorization signal to authorize the use of the motor vehicle when the following requirements are cumulatively satisfied:
  the angle, which is determined repeatedly after the expiration of the predefined first time interval, exceeds a predefined threshold,
  the repeatedly determined angle increases or becomes larger, and/or
  the repeatedly measured field strength of the first and/or second electromagnetic field also increases or becomes greater.

In sum, one aspect of the method according to the invention consists of determining whether or not the identification encoder is moving towards the motor vehicle. One way in which this can be determined according to the invention is by the identification encoder repeatedly determining the field strength of the signals emitted by the motor vehicle and verifying whether the field strength or field strengths is or are increasing. Alternatively, this can be determined in accordance with the invention by the identification encoder repeatedly determining the angle between the signals emitted by the motor vehicle and verifying whether the repeatedly determined angles are increasing.

In a preferred embodiment of the method according to the invention, it is provided that in the motor vehicle the angle that is determined and transmitted to the motor vehicle is in each case repeatedly provided with a corresponding time stamp and stored, in order to form a reference angle pattern for comparison with angle patterns determined later and to supply an authorization signal for authorizing the use of the motor vehicle only in the event of a positive pattern match.

This measure enables the protection against manipulation to be further increased.

In another preferred embodiment of the method according to the invention, it is provided that in the motor vehicle the field strength that is determined and transmitted to the motor vehicle is repeatedly provided in each case with a corresponding time stamp and stored, in order to form a reference field-strength pattern for comparison with field-strength patterns determined later and to supply an authorization signal for authorizing the use of the motor vehicle only in the event of a positive pattern match.

The optional measures described above may advantageously be used as alternatives or in combination to increase the protection of the method according to the invention against manipulations.

According to an advantageous design of the method according to the invention, the time interval between the emission of the first signal by the first motor vehicle antenna and the emission of the second signal by the second motor vehicle antenna is chosen to be so short—but different from zero—that the identification encoder carried by the driver is not moved significantly as the driver approaches the motor vehicle. Therefore, the determination of the angle at least between the determined spatial component of the first electromagnetic field of the first received signal and the determined spatial component of the second electromagnetic field of the second received signal is not significantly distorted or rendered unusable by the movement of the driver or by the associated movement of the identification encoder.

In one embodiment of the method according to the invention, it is provided that the motor vehicle has a further, third antenna, which is spatially separated from both the first antenna and the second antenna. In a similar or identical way, the angle at least between the determined spatial component of the first electromagnetic field of the first received signal and the determined spatial component of the third electromagnetic field of a third signal emitted by the third antenna and received by the identification encoder is determined.

The above measures enable a further improvement in the security of the method according to the invention against manipulation.

In an extension of the method according to the invention it is provided that the spatial components of the first electromagnetic field of the first received signal determined by the identification encoder are the x, y, and z components of the electromagnetic field of a first Cartesian coordinate system.

According to one embodiment of the method according to the invention, the spatial components of the second electromagnetic field of the second received signal determined by the identification encoder, the x, y, and z components of the electromagnetic field, are substantially the components with respect to the first Cartesian coordinate system. The term "substantially" refers to the fact that, for minor movements of the identification encoder in very short time intervals, the underlying Cartesian coordinate system or reference system used in the determination of the components changes only marginally in space between the repeated determination of the angles.

According to an extension of the method according to the invention, the spatial components of the third electromagnetic field of the received third signal determined by the identification encoder, the x, y, and z components of the electromagnetic field are substantially those of the first Cartesian coordinate system.

In one embodiment of the method according to the invention it is provided that at least one first vector is formed by computation from the x, y, and z components of the first electromagnetic field of the received first signal determined by the identification encoder and a second vector is formed by computation from the x, y, and z components of the second electromagnetic field of the received second signal determined by the identification encoder, and the scalar product of these two vectors is calculated.

In a preferred configuration of the method according to the invention, it is provided that the angle between the two vectors is determined by computation using the scalar product.

As a result of the above measures, only a low level of processor power is required for calculating the angles.

According to a preferred extension of the method according to the invention, it is provided that the calculated angle exceeds a predetermined threshold value of substantially zero degrees. In particular, a threshold value of greater than 1 to 10 degrees is provided, preferably 1 to 5 degrees.

In a further configuration of the method according to the invention, the threshold value, which is greater than zero degrees, is increased with decreasing distance of the identification encoder from the motor vehicle. The distance is preferably determined via a propagation time measurement between the signals that are exchanged between the vehicle and identification encoder.

According to a particularly preferred embodiment of the invention, it is provided that the first, second, and/or third antenna each emit at the same or different frequency in the frequency range from 20 kHz to 140 kHz, preferably at approximately 125 kHz, and preferably with a temporal offset.

The above measures enable a further improvement in the security of the method according to the invention for authorizing the use of a motor vehicle.

In addition, the invention proposes an advantageous motor vehicle access system, in which the execution of at least one step of the method according to the invention is provided.

According to an advantageous extension of the vehicle access system according to the invention, the identification encoder is a wireless key or a smartphone, wherein the smartphone is preferably equipped with an identification encoder software application, such as a so-called app.

In another advantageous design of the motor vehicle access system according to the invention it is provided that the identification encoder is a smartphone equipped with a computer chip, a wireless motor vehicle key equipped with a computer chip, or a chip card with a computer chip.

Finally, in a further advantageous embodiment of the vehicle access system according to the invention, it is provided that the identification encoder has a sensor for determining or calculating an electromagnetic field and/or the components of the electromagnetic field, which has been generated by one or a plurality of motor vehicle antennas in the area of the identification encoder.

A particular advantage of the vehicle access system according to the invention is that these can be provided in a way which is cost-effective and yet reliable against manipulation.

Also proposed is an immobilizer according to the invention, in which the execution of at least one step of a method according to the invention is provided.

In addition, a vehicle having an immobilizer according to the invention is proposed, in which the execution of at least one step of a method according to the invention is provided.

Finally, the invention proposes a non-transitory computer-readable medium for controlling at least one processor, which causes the execution of at least one step of a method according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for authorizing use of a motor vehicle, including a first antenna and a second antenna, wherein the first antenna and the second antenna are physically separated from each other in space, by a portable identification encoder that has an identification encoder antenna, the method comprising:
- emitting, by the first antenna, a first signal, which is received by the identification encoder antenna;
- determining, by the identification encoder, at least one of spatial components of a first electromagnetic field of the first signal, using an angular resolution magnetic field sensor;
- emitting, by the second antenna, a second signal, which is received by the identification encoder antenna;
- determining, by the identification encoder, at least one of spatial components of a second electromagnetic field of the second signal, using the angular resolution magnetic field sensor;
- repeatedly transmitting, by the identification encoder, the at least one determined spatial component of the first electromagnetic field of the first signal, in each case after expiration of a predetermined time interval, and repeatedly transmitting the at least one determined spatial component of the second electromagnetic field of the second signal, in each case after the expiration of the predetermined time interval, to the motor vehicle;
- repeatedly determining after the expiration of the predetermined time interval, by a computer disposed in the motor vehicle, an angle between the determined spatial component of the first electromagnetic field of the first signal and the determined spatial component of the second electromagnetic field of the second signal; and
- supplying, by the motor vehicle, an authorization signal to authorize the use of the motor vehicle only when the angle, which is determined repeatedly after the expiration of the predetermined time interval, exceeds a predefined threshold, and at least one of the repeatedly determined angle increases and a repeatedly measured field strength of at least one of the first electromagnetic field and the second electromagnetic field increases;
- wherein the angle is transmitted to the motor vehicle, and in each case is repeatedly provided with a corresponding time stamp and stored, in order to form a reference angle pattern for comparison with angle patterns determined later and to supply the authorization signal for authorizing the use of the motor vehicle only in the event of a positive pattern match.

2. The method as claimed in claim 1, wherein the repeatedly measured field strength is transmitted to the motor vehicle and in each case is provided with a corresponding time stamp and stored, in order to form a reference field-strength pattern for comparison with field strength patterns determined later and to supply the authorization signal for authorizing the use of the motor vehicle only in the event of a positive pattern match.

3. The method for authorizing the use of the motor vehicle as claimed in claim 1, wherein the predetermined time interval between the emission of the first signal by the first antenna and the emission of the second signal by the second antenna is greater than zero and is chosen to be so short that the identification encoder carried by a driver is not moved as the driver approaches the motor vehicle and determination of the angle between the determined spatial component of the first electromagnetic field of the first signal and the determined spatial component of the second electromagnetic field of the second signal is not distorted or rendered unusable by movement of the driver or by associated movement of the identification encoder.

4. The method for authorizing the use of the motor vehicle as claimed in claim 1, wherein the motor vehicle has a third antenna, which is spaced apart from both of the first antenna and the second antenna in space and an angle between the determined spatial component of the first electromagnetic field of the first signal and a determined spatial component of a third electromagnetic field of a third signal, emitted by the third antenna and received by the identification encoder, is determined.

5. The method for authorizing the use of the motor vehicle as claimed in claim 4, wherein the spatial components of the third electromagnetic field of the third signal, determined by the identification encoder, the x, y, and z components of the electromagnetic field, are those of the first Cartesian coordinate system.

6. The method for authorizing the use of the motor vehicle as claimed in claim 4, wherein the first, second, and third antennas each emit at a frequency in a frequency range from 20 kHz to 140 kHz with a temporal offset therebetween.

7. The method for authorizing the use of the motor vehicle as claimed in claim 1, wherein the spatial components of the first electromagnetic field of the first signal determined by the identification encoder are x, y, and z components of the electromagnetic field of a first Cartesian coordinate system.

8. The method for authorizing the use of the motor vehicle as claimed in claim 7, wherein the spatial components of the second electromagnetic field of the second signal determined by the identification encoder, the x, y, and z components of the electromagnetic field, are components with reference to the first Cartesian coordinate system, wherein for minor movements of the identification encoder in very short time intervals, the first Cartesian coordinate system used in a determination of the components changes only marginally in space between repeated determinations of the angle.

9. The method for authorizing the use of the motor vehicle as claimed in claim 7, wherein a first vector is formed by computation from the x, y, and z components of the first electromagnetic field of the first signal determined by the identification encoder and a second vector is formed by computation from the x, y, and z components of the second electromagnetic field of the second signal determined by the identification encoder, and a scalar product of the first and second vectors is calculated.

10. The method for authorizing the use of the motor vehicle as claimed in claim 9, wherein an angle between the first and second vectors is determined by computation using the scalar product.

11. The method for authorizing the use of the motor vehicle as claimed in claim 10, wherein the angle between the first and second vectors exceeds a predetermined threshold value of zero degrees.

12. The method for authorizing the use of the motor vehicle as claimed in claim 11, wherein the predetermined threshold value is increased with decreasing distance of the identification encoder from the motor vehicle, wherein the distance is determined via a propagation time measurement between signals that are exchanged between the motor vehicle and the identification encoder.

13. A motor vehicle access system for authorizing use of a motor vehicle, comprising:
- a first antenna and a second antenna, wherein the first antenna and the second antenna are physically separated from each other in space;
- a portable identification encoder including an identification encoder antenna; wherein
- the first antenna emits a first signal, which is received by the identification encoder antenna;

the identification encoder determines at least one of spatial components of a first electromagnetic field of the first signal, using an angular resolution magnetic field sensor;

the second antenna emits a second signal, which is received by the identification encoder antenna;

the identification encoder determines at least one of spatial components of a second electromagnetic field of the second signal, using the angular resolution magnetic field sensor;

the identification encoder repeatedly transmits the at least one determined spatial component of the first electromagnetic field of the first signal, in each case after expiration of a predetermined time interval, and repeatedly transmits the at least one determined spatial component of the second electromagnetic field of the second signal, in each case after the expiration of the predetermined time interval, to the motor vehicle; and a computer disposed in the motor vehicle that repeatedly determines, after the expiration of the predetermined time interval, an angle between the determined spatial component of the first electromagnetic field of the first signal and the determined spatial component of the second electromagnetic field of the second signal;

wherein the motor vehicle supplies an authorization signal to authorize the use of the motor vehicle only when the angle, which is determined repeatedly after the expiration of the predetermined time interval, exceeds a predefined threshold, and at least one of the repeatedly determined angle increases and a repeatedly measured field strength of at least one of the first electromagnetic field and the second electromagnetic field also increases;

wherein the angle is transmitted to the motor vehicle, and in each case is repeatedly provided with a corresponding time stamp and stored, in order to form a reference angle pattern for comparison with angle patterns determined later and to supply the authorization signal for authorizing the use of the motor vehicle only in the event of a positive pattern match.

14. The motor vehicle access system for authorizing the use of the motor vehicle as claimed in claim 13, wherein the identification encoder is a wireless key or a smartphone equipped with an identification encoder software application.

15. The motor vehicle access system for authorizing the use of the motor vehicle as claimed in claim 14, wherein the identification encoder has a sensor for determining at least one of an electromagnetic field and components of the electromagnetic field, which has been generated by at least one of the first and second antennas in an area of the identification encoder.

16. The motor vehicle access system for authorizing the use of the motor vehicle as claimed in claim 13, wherein the identification encoder is a smartphone equipped with a computer chip, a wireless motor vehicle key equipped with a computer chip, or a chip card with a computer chip.

17. The motor vehicle access system for authorizing the use of the motor vehicle as claimed in claim 16, wherein the identification encoder has a sensor for determining at least one of an electromagnetic field and components of the electromagnetic field, which has been generated by at least one of the first and second antennas in an area of the identification encoder.

18. The motor vehicle access system for authorizing the use of the motor vehicle as claimed in claim 13, wherein the identification encoder has a sensor for determining at least one of an electromagnetic field and components of the electromagnetic field, which has been generated by at least one of the first and second antennas in an area of the identification encoder.

19. A non-transitory computer-readable medium comprising computer instructions executable by a processor to cause the processor to perform a method for authorizing use of a motor vehicle that has a first antenna and a second antenna, wherein the first antenna and the second antenna are physically separated from each other in space, by a portable identification encoder that has an identification encoder antenna, the method comprising:

emitting, by the first antenna, a first signal, which is received by the identification encoder antenna;

determining, by the identification encoder, at least one of spatial components of a first electromagnetic field of the first signal, using an angular resolution magnetic field sensor;

emitting, by the second antenna, a second signal, which is received by the identification encoder antenna;

determining, by the identification encoder, at least one of spatial components of a second electromagnetic field of the second signal, using the angular resolution magnetic field sensor;

repeatedly transmitting, by the identification encoder, the at least one determined spatial component of the first electromagnetic field of the first signal, in each case after expiration of a predetermined time interval, and repeatedly transmitting the at least one determined spatial component of the second electromagnetic field of the second signal, in each case after the expiration of the predetermined time interval, to the motor vehicle;

repeatedly determining after the expiration of the predetermined time interval, by a computer disposed in the motor vehicle, an angle between the determined spatial component of the first electromagnetic field of the first signal and the determined spatial component of the second electromagnetic field of the second signal; and supplying, by the motor vehicle, an authorization signal to authorize the use of the motor vehicle only when the angle, which is determined repeatedly after the expiration of the predetermined time interval, exceeds a predefined threshold, and at least one of the repeatedly determined angle increases and a repeatedly measured field strength of at least one of the first electromagnetic field and the second electromagnetic field also increases;

wherein the angle is transmitted to the motor vehicle, and in each case is repeatedly provided with a corresponding time stamp and stored, in order to form a reference angle pattern for comparison with angle patterns determined later and to supply the authorization signal for authorizing the use of the motor vehicle only in the event of a positive pattern match.

* * * * *